May 5, 1936.  A. DE MARCO  2,039,891
FRUIT JAR HOLDER
Filed Sept. 10, 1934
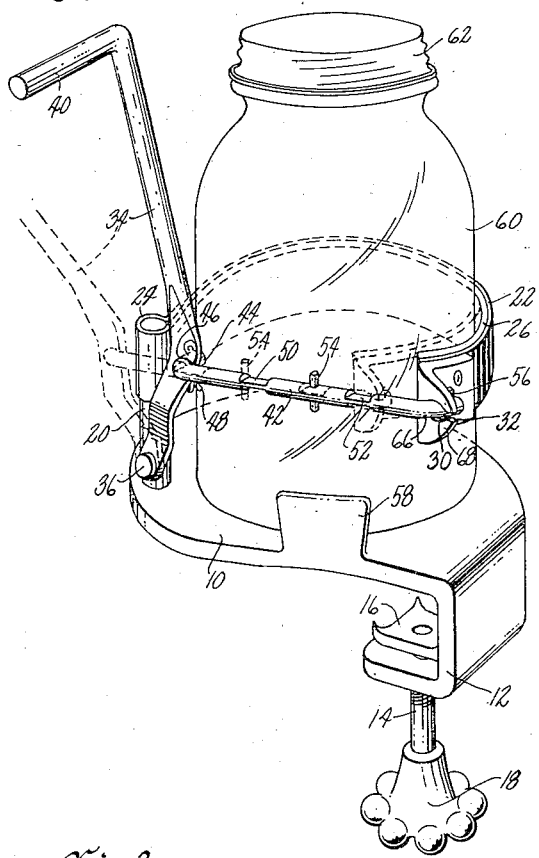
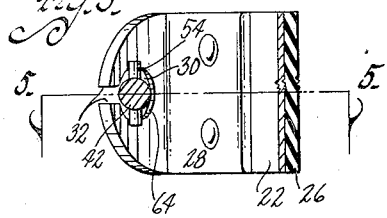
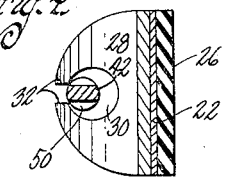
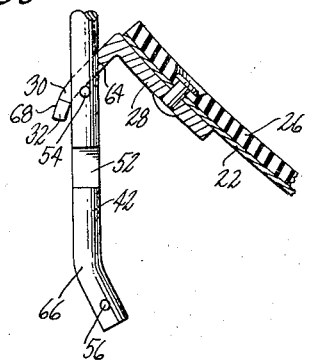
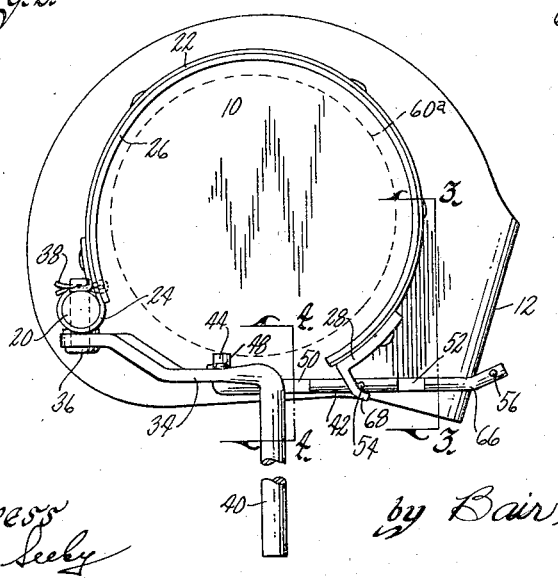
Inventor
Andrew De Marco
by Bair, Freeman & Sinclair
Attorneys Patented May 5, 1936

2,039,891

UNITED STATES PATENT OFFICE 2,039,891

FRUIT JAR HOLDER

Andrew De Marco, Des Moines, Iowa

Application September 10, 1934, Serial No. 743,402

3 Claims. (Cl. 81—3.3)

The object of my invention is to provide a fruit jar holder which is simple, durable and comparatively inexpensive to manufacture.

A further object is to provide a holder for fruit jars and the like which can be rigidly clamped to the edge of a table or other suitable support to facilitate canning by effectively holding the jar while tightening the lid thereon with the expenditure of a minimum of effort.

A further object is to provide a holder which can be easily operated by a light pressure of one hand while the other hand is used to tighten the lid on the jar.

More particularly, it is my object to provide a jar holder having a clamping band and a lever action for contracting the band around a fruit jar while enclosing the contents in the jar.

With these and other objects in view my invention consists in the construction, arrangement and combination of the various parts of my fruit jar holder, whereby the objects contemplated are attained, as hereinafter more fully set forth, pointed out in my claims, and illustrated in the accompanying drawing, in which:

Figure 1 is a perspective view of a fruit jar holder embodying my invention, showing a fruit jar in place relative thereto and illustrating by dotted lines the clamping position of the holder.

Figure 2 is a plan view of the holder showing the band expanded and a fruit jar in place, the outline of the fruit jar being illustrated by dotted lines.

Figure 3 is an enlarged sectional view on the line 3—3 of Figure 2 showing details of an adjustable and disconnectible connection between two elements of the holder.

Figure 4 is a similar sectional view on the line 4—4 of Figure 2 showing further details of the connection; and Figure 5 is a sectional view on the line 5—5 of Figure 3 showing still further details of the connection.

On the accompanying drawing, I have used the reference numeral 10 to indicate a base. It has a U-shaped portion 12 provided with a clamping screw 14. A swivel head 16 is provided on the clamping screw, while secured to the screw is an operating handle 18. The base 10 is adapted for resting on the edge of a table or the like whereupon it can be rigidly supported on the table by tightening the adjusting screw 14 in an obvious and well known manner.

A support 20 extends upwardly from the base 10, the support being preferably post-like. A clamping band 22 is provided, the band being formed preferably of resilient material such as spring steel and having an eye 24 at one end frictionally but removably engaging the post 20. The band 22 may be lined with a strip of rubber 26 or similar resilient material if desired.

The band 22 is semicircular as best shown in Figure 2 and on its free end an ear 28 is secured. The ear 28 is bifurcated as indicated at 30 and has a restricted entrance indicated by the reference numeral 32.

A lever 34 is pivoted to the post 20. The pivot pin is indicated at 36 and may have a cotter key 38 associated therewith so that the pin can be removed if desired. The lever 34 has a handle 40.

Pivoted to the lever 34 is a link 42. The link has an angular extension 44 received through a perforation 46 of the lever 34 and provided with a cotter pin 48 for removability. The link 42 is provided with spaced reduced portions 50 and 52.

Spaced from the portion 50, I provide a projection as for instance a laterally arranged pin 54. Spaced from the reduced portion 52 is a similar pin 56.

Extending upwardly from the base 10 is a projection 58 adapted to limit horizontal movement of a fruit jar 60 relative to the base 10.

*Practical operation*

In the operation of my device, the position of the eye 24 on the post 20 is such that the normal tendency of the band 22 is to spring to the position of Figure 2. In this position, the band is open and the fruit jar 60 can be readily placed therein as shown by dotted lines. The jar can then be filled with fruit preparatory to closing the jar by means of a lid 62.

The handle 40 of the lever 34 can then be grasped with the left hand and pushed away from the user to the dotted line position of Figure 1, whereupon the fruit jar is rigidly held against rotation, the projection 58 preventing undesired swinging of the jar 60 toward the left. Due to the leverage gained by the lever 34, a sufficiently tight grip is had on the jar to hold it against rotation even though but light pressure is exerted on the lever. Thereupon the lid 62 can be tightened in position, maximum tightness being easily procured without any danger of the jar 60 rotating.

In Figure 1, the holder is adjusted for a quart size jar, while in Figure 2, it is adjusted for a pint size jar. These are the sizes most commonly used, although it will be obvious that I can, by properly changing the dimensions, make the device adaptable for any size of jar desired and for any number of sizes.

The device illustrated can be adjusted in the following described manner.

To disconnect the band 22 from the link 42 to change the adjustment from Figure 1 to Figure 2, the ear 28 is moved forwardly until the restricted entrance 32 can pass the reduced portion 52 in the manner illustrated in Figure 4, whereupon the ear can be moved toward the right in this figure and can then be swung ahead so that the restricted entrance 32 registers with the reduced portion 50 whereupon the ear can be swung to the left, and when the band is allowed to expand, it will engage the pin 54 as in Figure 2 instead of the pin 56. The bifurcation 30 of the ear is beveled as indicated at 64 so as to not interfere with the action of the link 42 relative to the ear (see Figure 5) while the link is bent as indicated at 66 to accommodate the different angular positions of the ear, which positions are illustrated by comparison in Figures 1 and 2. The outer end of the ear 28 is preferably curved as indicated at 68 to prevent any possibility of the pin 54 or the pin 56 slipping off the ear while using the device.

My device can be safely used without danger of cutting the hands when a jar breaks which sometimes occurs just below the lid when the lid is screwed on too tightly.

Although I have illustrated my jar holder as being designed for and used in connection with round fruit jars, it is also applicable to square ones which are as readily held in the band 22 as the round ones. If the holder is to be used on square jars only, the band 22 can be formed in the proper shape to fit them if desired.

Changes of this character and others may be made without departing from the real spirit and purpose of my invention, and it is my intention to cover by my claims, any modified forms of structure or use of mechanical equivalents, which may be reasonably included within their scope.

I claim as my invention:

1. In a fruit jar holder, a base, means for clamping said base to the edge of a table or the like, a post extending upwardly from said base, a semicircular band of resilient material mounted at one end on said post, a lever pivotally mounted on said post and a link connecting said lever with the other end of said band, said link having spaced reduced portions and a transversely arranged pin spaced from each reduced portion and said band having a bifurcated ear to selectively coact with said pins, the bifurcation in said ear having a restricted entrance.

2. In a fruit jar holder, a base, a flexible band having one end rigidly mounted relative to said base, a lever pivoted relative to said base, and a link connecting said lever with the other end of said band, said link having reduced portions and a projection spaced from each reduced portion and said band having a bifurcated ear to selectively coact with said projections, the bifurcation in said ear having a restricted entrance.

3. In a fruit jar holder, a base, means for clamping said base to the edge of a table or the like, a post extending upwardly from said base, a semi-circular band of resilient material having one end mounted on said post, said band extending horizontally therefrom, an upright lever, means for pivoting the lower end thereof relative to and adjacent said base and a link having one end connected with said lever above the pivoted lower end thereof and its other end connected to the other end of said band, said link having spaced reduced portions and transversely and oppositely arranged projecting portions spaced from each reduced portion and the other end of said band having a bifurcated ear to selectively coact with said projections.

ANDREW DE MARCO.